(12) United States Patent
Roskind et al.

(10) Patent No.: US 7,260,836 B2
(45) Date of Patent: Aug. 21, 2007

(54) SYSTEM AND METHOD FOR DISTRIBUTED AUTHENTICATION SERVICE

(75) Inventors: Jim Roskind, Redwood City, CA (US); Chris Toomey, Cupertino, CA (US)

(73) Assignee: AOL LLC, Dulles, VA (US)

( * ) Notice: Subject to any disclaimer, the term of this patent is extended or adjusted under 35 U.S.C. 154(b) by 962 days.

(21) Appl. No.: 10/086,104

(22) Filed: Feb. 26, 2002

(65) Prior Publication Data

US 2003/0163730 A1      Aug. 28, 2003

(51) Int. Cl.
*H04L 29/00* (2006.01)
*H04L 29/06* (2006.01)

(52) U.S. Cl. .................. 726/4; 713/154; 713/155; 713/157; 713/175; 726/5; 726/10; 726/21; 709/225

(58) Field of Classification Search .......... 713/201; 726/1–21, 26–30
See application file for complete search history.

(56) References Cited

U.S. PATENT DOCUMENTS

| | | | | |
|---|---|---|---|---|
| 5,781,724 | A * | 7/1998 | Nevarez et al. ............. | 726/17 |
| 5,867,665 | A | 2/1999 | Butman et al. ........ | 395/200.68 |
| 5,870,562 | A | 2/1999 | Butman et al. ........ | 395/200.68 |
| 5,974,453 | A | 10/1999 | Andersen et al. .......... | 709/220 |
| 6,023,724 | A | 2/2000 | Bhatia et al. ............... | 709/218 |
| 6,026,430 | A | 2/2000 | Butman et al. ............. | 709/203 |
| 6,108,330 | A | 8/2000 | Bhatia et al. ............... | 370/352 |
| 6,108,703 | A | 8/2000 | Leighton et al. ............ | 709/226 |
| 6,144,657 | A | 11/2000 | Baehr ......................... | 340/352 |
| 6,157,636 | A | 12/2000 | Voit et al. .................... | 370/353 |
| 6,178,455 | B1 | 1/2001 | Schutte et al. .............. | 709/228 |
| 6,178,511 | B1 | 1/2001 | Cohen et al. ............... | 713/201 |
| 6,185,598 | B1 | 2/2001 | Farber et al. ............... | 709/200 |
| 6,208,656 | B1 | 3/2001 | Hrastar et al. .............. | 370/401 |
| 6,233,234 | B1 | 5/2001 | Curry et al. ................ | 370/356 |

(Continued)

FOREIGN PATENT DOCUMENTS

| | | |
|---|---|---|
| EP | 938 217 | 8/1999 |
| EP | 940 959 | 9/1999 |
| EP | 1 089 516 | 4/2001 |

OTHER PUBLICATIONS

Hornberg, P., M. van Steen, and A. Tanenbaum; Unifying Internet Services Using Distributed Shared Objects; 1996; Faculty of Math and Computer Science.

(Continued)

*Primary Examiner*—Syed A. Zia
(74) *Attorney, Agent, or Firm*—Michael A. Glenn; Glenn Patent Group (57) ABSTRACT

A system and method for distributed authentication service is disclosed, which prevents any single participant from monitoring the logon rates of other participants is disclosed. In particular, there is no single central list that is consulted to identify where the authentication should be performed. Rather, the systems keys on the domain portion of the global user ID. The client portion parses the entered ID and re-directs the submission to the appropriate authentication service. Rather than consulting a global look-up table, the domain name is pre-pended to a central host domain and DNS is consulted to find the location of the underlying authentication servers. The DNS look-up is distributed and cached and, as a result, the look-up cannot be centrally monitored.

15 Claims, 7 Drawing Sheets

U.S. PATENT DOCUMENTS

| | | | |
|---|---|---|---|
| 6,233,458 B1 | 5/2001 | Haumont et al. | 455/445 |
| 6,249,523 B1 | 6/2001 | Hrastar et al. | 370/401 |
| 6,275,944 B1 | 8/2001 | Kao et al. | 713/202 |
| 6,289,010 B1 | 9/2001 | Voit et al. | 370/352 |
| 6,289,039 B1 | 9/2001 | Garodnick | 375/143 |
| 6,298,383 B1 * | 10/2001 | Gutman et al. | 709/229 |
| 6,421,768 B1 * | 7/2002 | Purpura | 711/164 |
| 6,826,698 B1 * | 11/2004 | Minkin et al. | 726/1 |
| 7,137,006 B1 * | 11/2006 | Grandcolas et al. | 713/180 |

OTHER PUBLICATIONS

Kim, G., H. Orman, and S. O'Malley; Implementing a Secure rlogin Environment: A Case Study of Using a Secure Network Layer Protocol; Department of Computer Science, Jun. 1995.

McDaniel, P. and S. Jamin; A. Scalable Key Distribution Hierarchy; 1998; University of Michigan, Mar. 1998.

Schuba, C. and E. Spafford; Addressing Weaknesses in the Domain Name System Protocol; COAST Laboratory, Aug. 1993.

Schuba, C. and E. Spafford; Countering Abuse of Name-Based Authentication; COAST Laboratory, 1996.

* cited by examiner

| FQDN | IP ADDRESS |
|---|---|
| aol.com.mcn.org | 123.123.123.123 |
| — | |
| — | |
| — | |
| — | |
| — | |
| — | |
| — | |
| — | |
| default.mcn.org | 100.120.130.140 |

SYSTEM AND METHOD FOR DISTRIBUTED AUTHENTICATION SERVICE

BACKGROUND OF THE INVENTION

1. Technical Field

The invention relates generally to Internet based authentication technology. More particularly, the invention relates to a system and method for distributed authentication service.

2. Description of the Prior Art

The explosive growth of the Internet is changing the ways in which we communicate, conduct business, and pursue entertainment. A few years ago, electronic commerce (E-commerce) was just an interesting concept. By 1999, however, it had become the hottest thing around. Today, not only are consumers buying an enormous volume of goods or services over the Internet, but the business-to-business E-commerce has taken off as well.

The basic cell of E-commerce is an electronic transaction, which requires a buyer or user fills out one or more electronic forms on screen and click a button named "send", "buy" or "submit", etc. To complete such an electronic transaction, a user has to go through an authentication process. In other words, the user must provide the seller or service provider with some information such as his or her personal identification, contact information, or even financial information. The authentication process may take from several minutes to hours. Because each seller or service provider maintains its own authentication server and database, millions of seller and service providers might share thousands of millions of consumers or users. Some of the consumers or users might be required to go through the same or similar authentication process again and again if they have transactions with many sellers or service providers. This repetitive authentication not only wastes consumers' precious time, but also burdens the sellers or service providers because they have to expand their databases to keep detailed authentication information for a growling number of users. This situation brings forth a technical need to create a universal, unified single-logon infrastructure wherein a specific user may be authenticated once for all and the authentication result is widely recognized by a large number of sellers or service providers.

In responding to that need, several approaches have been developed. For example, Microsoft Corporation has introduced a ".NET Passport" single sign-in system. With ".NET Passport", a user doesn't need to register a member name and password at each new site he visits. The user may simply use his e-mail address and password that registered as his ".NET Passport" to sign in to any participating site or service. The information the user registers with ".NET Passport" is stored online, securely, in the ".NET Passport" database as the user's ".NET Passport profile." When the user signs in to a ".NET Passport" participating site by typing his e-mail address and password in the ".NET Passport" sign-in box, ".NET Passport" confirms that (1) the e-mail address he typed is registered with ".NET Passport", and (2) the password he typed is correct. ".NET Passport" then notifies the site that the user has provided valid "sign-in credentials", and he is given access to the participating site. Once the user signs in to one ".NET Passport" participating site during an Internet session, he can sign in to others simply by clicking the ".NET Passport" sign-in button on each site.

Another example is America Online Inc.'s "Screen Name Service" system, which provides free service allowing anyone with a "Screen Name" to register easily and securely at a variety of Web sites. The "Screen Name Service" eliminates a user's need to remember multiple names and passwords for all the places he visits on the Web. With the "Screen Name Service" system, each user has a "My Profile", which stores the user's personal information used to make registering at sites across the Web simple and secure. When the user registers at a participating Web site using the service, he has the opportunity to choose which fields of information stored by AOL, if any, he would like to share with that site. No information is shared with any Web site without the user's explicit permission. When the user agrees to share certain information with a participating site, that information is conveyed to the Web site at which he is registering. Another feature is that the user is provided with a "My Site List", which is an effective way to manage personal information because it shows the user with which sites he has registered with using the service. The user can view the privacy policy of a site to see how it uses information it knows about the user. The user can also decide if he would like to be signed into the site without being prompted and if the site should be updated with information if "My Profile" changes.

The common characteristic of these approaches is that they implement a centralized solution for authentication and authentication information management. Undoubtedly, the centralized solution may overcome the repetitive authentication and repetitive storage problems that exist in the scattered, disorganized situation.

However, the centralized solution has three major disadvantages. First, in a centralized authentication system, because all the login requests go to a central authentication server, the traffic to the server could be very heavy, the requirements for the process capability and database size could be predictably high, and the authentication process would be very slow when the number of requests is overwhelmed for the server. Second, in case that the central authentication system fails, all the authentication requests would be suspended. Third, the central authentication service provider could monitor the participating sites' logon rates and a site which hosts a user's login page could monitor the user's logon information.

What is desired is a solution to have each authentication carried out at one of participating servers and have the authentication result distributed and cached all over the network of the participating servers so that the authentication results cannot be centrally monitored.

SUMMARY OF INVENTION

The invention herein comprises a system and method for providing a distributed authentication service. According to the invention, the user names are chosen from a fairly universal name space, e.g., communication addresses, and yet the servicing of the authentication, e.g., password checking, is distributed among the participants of an authentication federation that the system supports. Typically, the participants are commercial servers that can host authentication. A key goal of this distributed system is to prevent any single participant from monitoring the logon rates of other participants. Most critically, there is no single central list that is consulted to identify where the authentication should be carried out.

In the preferred embodiment, the system keys on the domain portion of the global user identification (GUID), which is typically an email address formatted ID. The client portion of the system, typically implemented as JavaScript function in a browser, parses the entered GUID, and redirects the submission to the appropriate authentication server. Rather than consulting a global lookup table, the domain portion of the GUID is pre-pended to a central host domain, i.e., the distributed authentication system's domain, and the domain name system (DNS) is consulted to find location of the underlying authentication servers. A critical point is that the DNS lookup is distributed and cached, and as a result, the lookups cannot be centrally monitored.

The system may further comprise an authentication server as a default server. The DNS resolver in the central location can automatically map all unrecognized domains into the default server. The end result is that substantially all possible GUID's are automatically distributed to the appropriate authentication servers.

Note that in a browser scenario, the scanning and translating are performed by simple standard JavaScript, and the submission can be automatically sent to the appropriate authentication server without the party that hosted the login page being allowed to see any of the information.

DETAILED DESCRIPTION

Figure 1A:
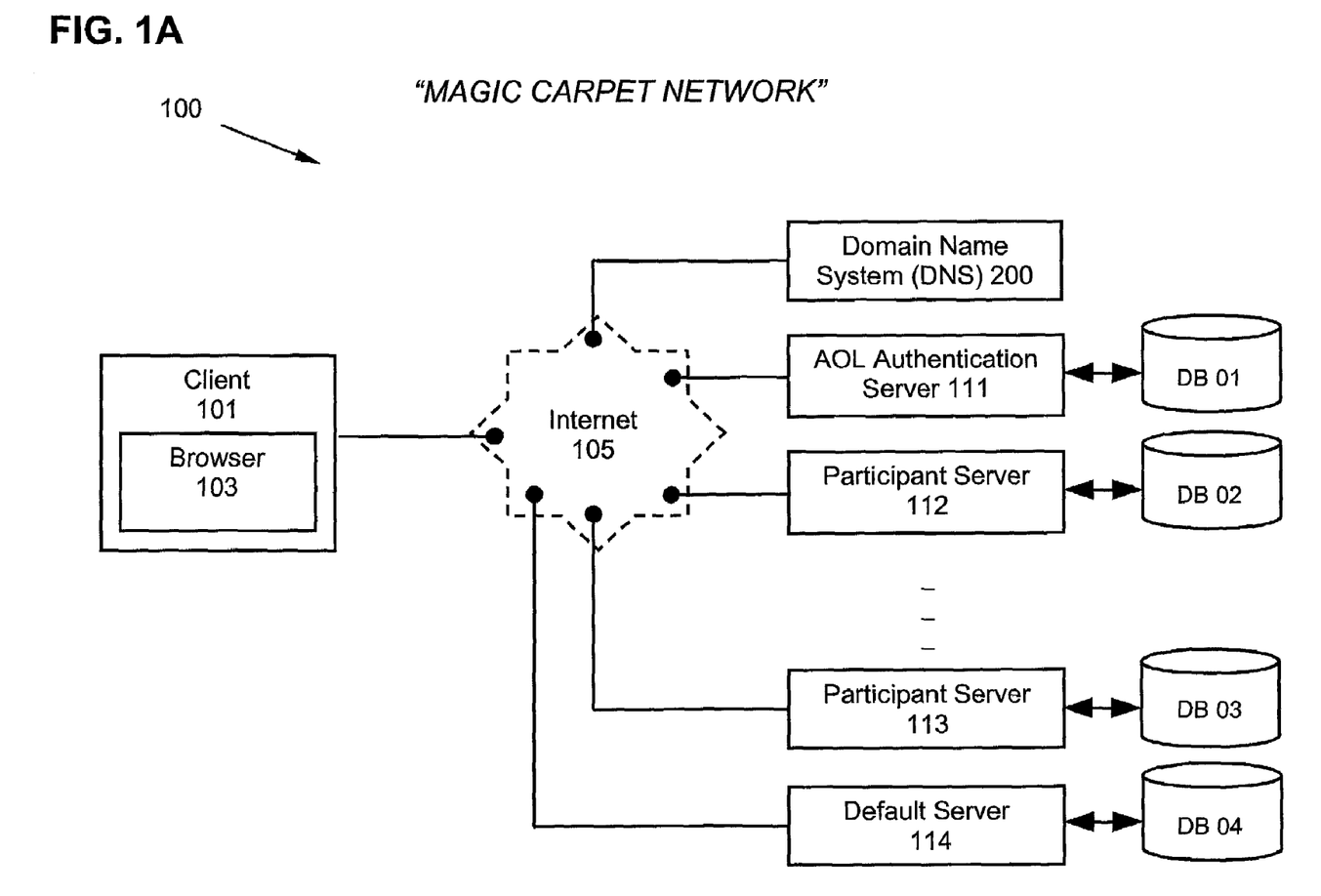
FIG. 1A is a block diagram illustrating a network 100 that facilitates distributed authentication service.

FIG. 1A is a block diagram illustrating an exemplary network 100, named Magic Carpet Network (MCN), which provides distributed authentication service among a global authentication federation. The MCN network includes a number of clients, e.g., client device 101, and a number of authentication servers, e.g., servers 111~113, which are communicatively connected via the Internet 105. Each authentication server represents a participant of the global authentication federation and has a database, e.g., DB 01~DB 03, which caches its registered users' identification information and any authentication token from other participating authentication servers. Each client or authentication server can access a local domain name server, which is one of many domain name server's coupled in a domain name system (DNS).

Figure 1B:
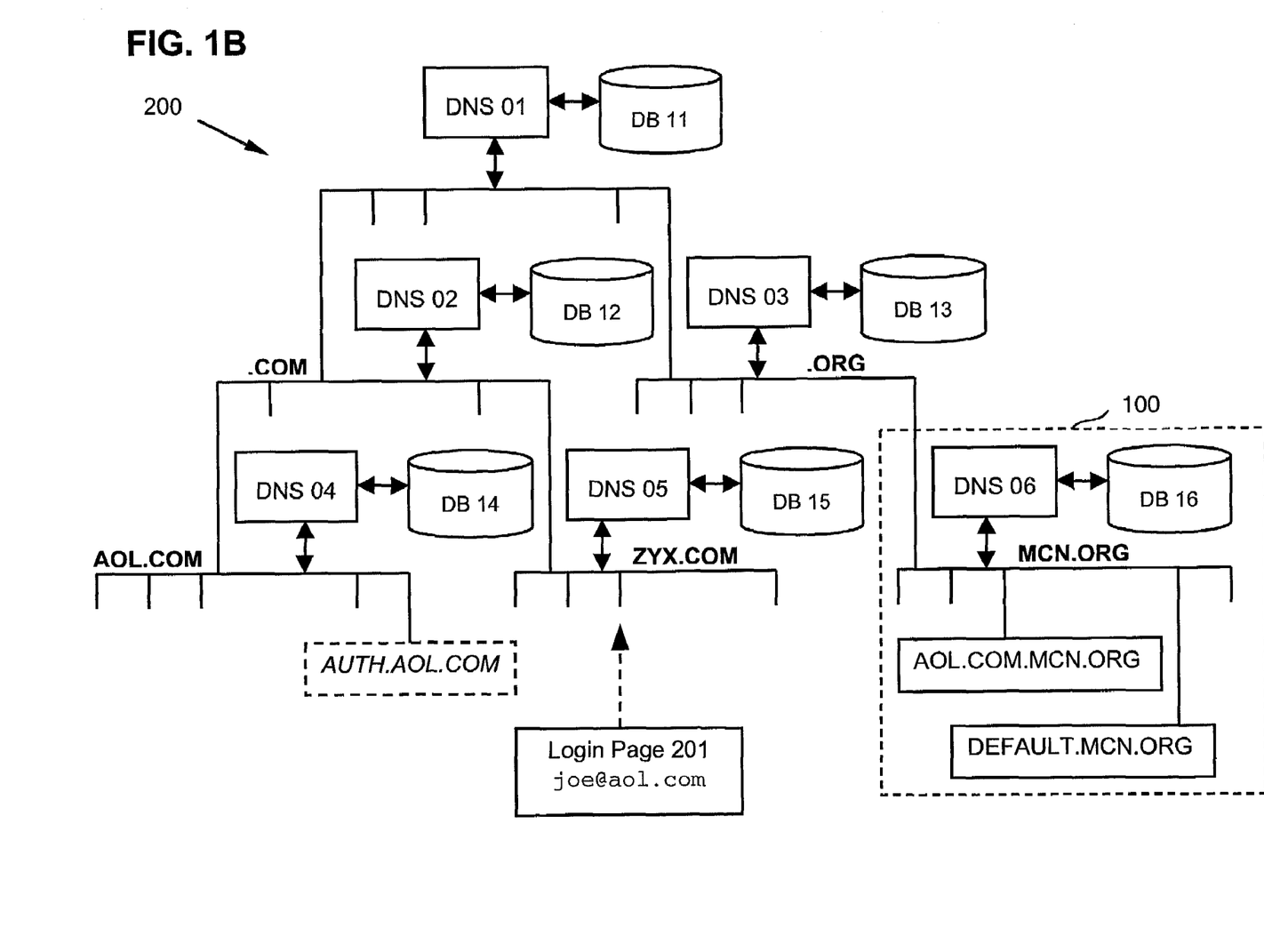
FIG. 1B is a schematic diagram illustrating an exemplary domain name system (DNS) 200 incorporated in a global network.

FIG. 1B is a schematic diagram illustrating an exemplary domain name system 200 incorporated in a global network. A domain name system (DNS) is a general-purpose, replicated, distributed data query service for looking up host Internet Protocol (IP) addresses based on host names. It is hierarchical, consisting of domains, sub-domains, sites, and hosts. Unique names are formed from smallest to largest, and are of the form user@host.site.subdomain.domain, where host and site are often optional. On the Internet, domain names typically end with a suffix denoting the type of site. For example, ".COM" for commercial sites and ".ORG" for organizations. A name resolution client, such as the client 101 in FIG. 1A, can be configured to search for host information in the following order: first in the local/etc/hosts file, second in network information service (NIS), and third in DNS. This sequencing of naming services is sometimes called name service switching. DNS can be queried interactively using command nslookup.

The MCN network 100 illustrated in FIG. 1A is registered under a unique domain name, for example MCN.ORG, in the central location of the DNS 200. The MCN network 100 requires each participant to register its authentication server as an individual machine under the MCN domain. In other words, the hostnames of the authentication servers share a common suffix. For example, AOL, as a participant host, registers its authentication server as AOL.COM.MCN.ORG under the unique domain MCN.ORG. The domain name server DNS 06 associated with the MCN network 100 just treats each participant authentication server as a host machine. For example, it treats AOL.COM.MCN.ORG as the host name of AOL Authentication Server 101.

Figure 1C:
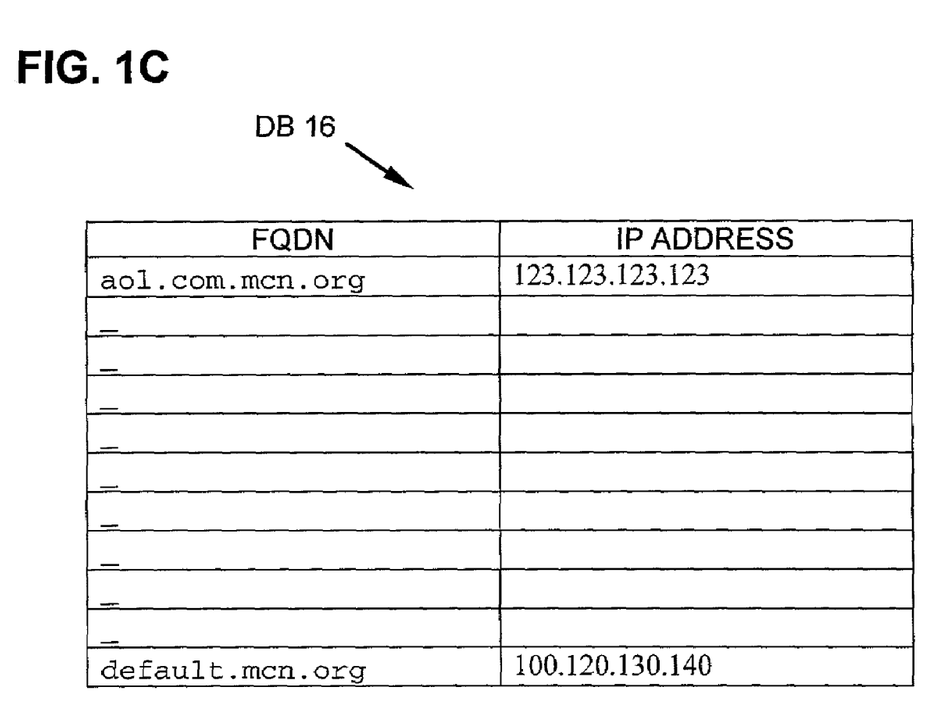
FIG. 1C is a table diagram illustrating an IP address database associated with the domain name server DNS 06 in the network 100.

As illustrated in FIG. 1C, the database DB 16 associated with the domain name server DNS 06 maintains a list of fully qualified domain names (FQDN) for the registered authentication servers. A FQDN consists of its local hostname and its domain name, including a top-level domain. For example, AOL.COM.MCN.ORG is a FQDN, in which AOL.COM is a host name, MCN.ORG is a domain name, and .COM is a top level domain name. Each of FQDN has a unique Internet Protocol (IP) address, which was installed in the database DB 06 when a commercial participant of the federation registered its authentication server under the domain MCN.ORG.

Client device 101 is empowered with an interface that enables a user to interact with a distributed authentication system embodied in the MCN network 100. In the preferred embodiment, the client device 101 includes a browser 103 which displays HTML file. The HTML facilitates a number of functions, including the authentication function, which is typically implemented in JavaScript. Alternatively, the client device 101 may include an application specifically for managing the authentication process.

To initiate an authentication process, a user must log in the distributed authentication system by entering his global user identification (GUID) and password and clicking a login button. A GUID is in a universal name space format, for example, an email address format. Thus any given GUID consists of two portions separated by a delimitation symbol, such as @. The first portion is the user's user name, and the second portion is a domain name indicating the domain of a server (such as AOL.COM) with which the user registered. For example, an AOL registered user with a user name, joe, should enter his GUID joe@AOL.COM and his password secret911 for authentication by AOL Authentication Server 111, which is registered as AOL.COM.MCN.ORG under the domain MCN.ORG.

Referring to FIG. 1B, assuming the user enters his GUID and password from a page 201 hosted by ZYX.COM. Once the user gets logged in, the client portion of the authentication system, parses the user's GUID joe@AOL.COM and extracts the domain portion AOL.COM from the GUID.

Then, it appends the MCN domain name as a suffix to the domain portion. As a result, a FQDN AOL.COM.MCN.ORG is formed.

The client portion of the authentication system first looks up a local domain name server DNS 05 to find location of the authentication server with a FQDN AOL.COM.MCN.ORG. After if fails in DNS 05, it populates the lookup request to its upper level DNS 02; after it fails in DNS 02, it populates the lookup request to the top DNS 01, where it locates the DNS 03 for the "ORG" network, and further locates the DNS 06 for the MCN network 100, and eventually it locates AOL.COM.MCN.ORG. In responding to the lookup request from the client device 101, the DNS system returns the unique IP address for AOL.COM.MCN.ORG to the client 101. This unique IP address is automatically cached in the DNS along the returning route, i.e., DNS 06 →DNS 03→DNS 01 DNS 02→DNS 05. Note that the critical point is that the DNS lookup is distributed and ached, and as a result, the DNS lookups cannot be centrally monitored by any participant of the federation.

In an equivalently preferred embodiment of the invention, the distributed authentication system supported by the MCN network 100 includes a default server 114 with a FQDN DEFAULT.MCN.ORG. If the DNS lookup totally fails, i.e. the domain included in the lookup request sent by the client device 101 is not recognized by the DNS 200, a DNS resolver in the central location of the DNS 200 can automatically map the unrecognized domain to the default server 114. The default server 114 takes responsibility to authenticate the user by looking up its local database. The end result is that all possible MCN ID's are automatically distributed to the appropriate servers.

Once the client 101 received the IP address of the targeted authentication server, i.e. AOL Authentication Server 111 in our example, it sends the user's user name joe with his password secret911 to AOL Authentication Server 111 for authentication. When AOL Authentication Server 111 receives the request, it looks up its local database DB 01 for the user entry, validates the user name and password, and sends an authentication token back to the user. The authentication token is cached in the client device. When the user sends request to any participant servers, the authentication token is automatically attached. The attached authentication token is recognized by any participant server of the federation and is automatically cached in the participant server's database when the participant server receives the authentication token. In this way, the user's detailed authentication information is stored only in one participant server's authentication database, but the authentication token is distributed all over the participants' authentication databases. Because an authentication server does not need to store every user's detailed authentication information, its authentication database can be relatively small in size.

In another equivalently preferred embodiment, the client portion of the authentication system has a mapping list of the fully qualified domain names (FQDN) for all registered authentication servers. When the user gets logged in, the system parses and extracts the domain portion from the user's GUID, and directly checks the mapping list to find the IP address for the target authentication server. If the local list checkup fails, the authentication request may be automatically mapped into the default authentication server 114 as described above.

In another equivalently preferred embodiment, the local list checkup and the DNS lookup may be combined. For example, the system first checks the local mapping list. If the target authentication server's IP address is not found from the mapping list, then start the DNS lookup process. If the DNS lookup fails, then automatically map the unrecognized domain to the default server 114 as described above.

In another equivalently preferred embodiment, all participants are not registered in a specific domain. Instead, each participating authentication server is registered with a standard server name in its main server's domain. For example, AOL Authentication Server 111 has a FQDN AUTH.AOL.COM, USPTO's authentication server has a FQDN AUTH.USPTO.GOV, etc. In other words, the host names of these authentication servers share a common prefix, but they reside in different domains. When the user gets logged in, the authentication system first parses and extracts the domain portion of the GUID. Then, it either checks a local mapping list or looks up the DNS 200 or performs both local list checkup and DNS lookup to locate the IP address for the target authentication server. If the IP address for the target authentication server is not found, the system may map the authentication request to the default server 114 as described above.

Figure 2:
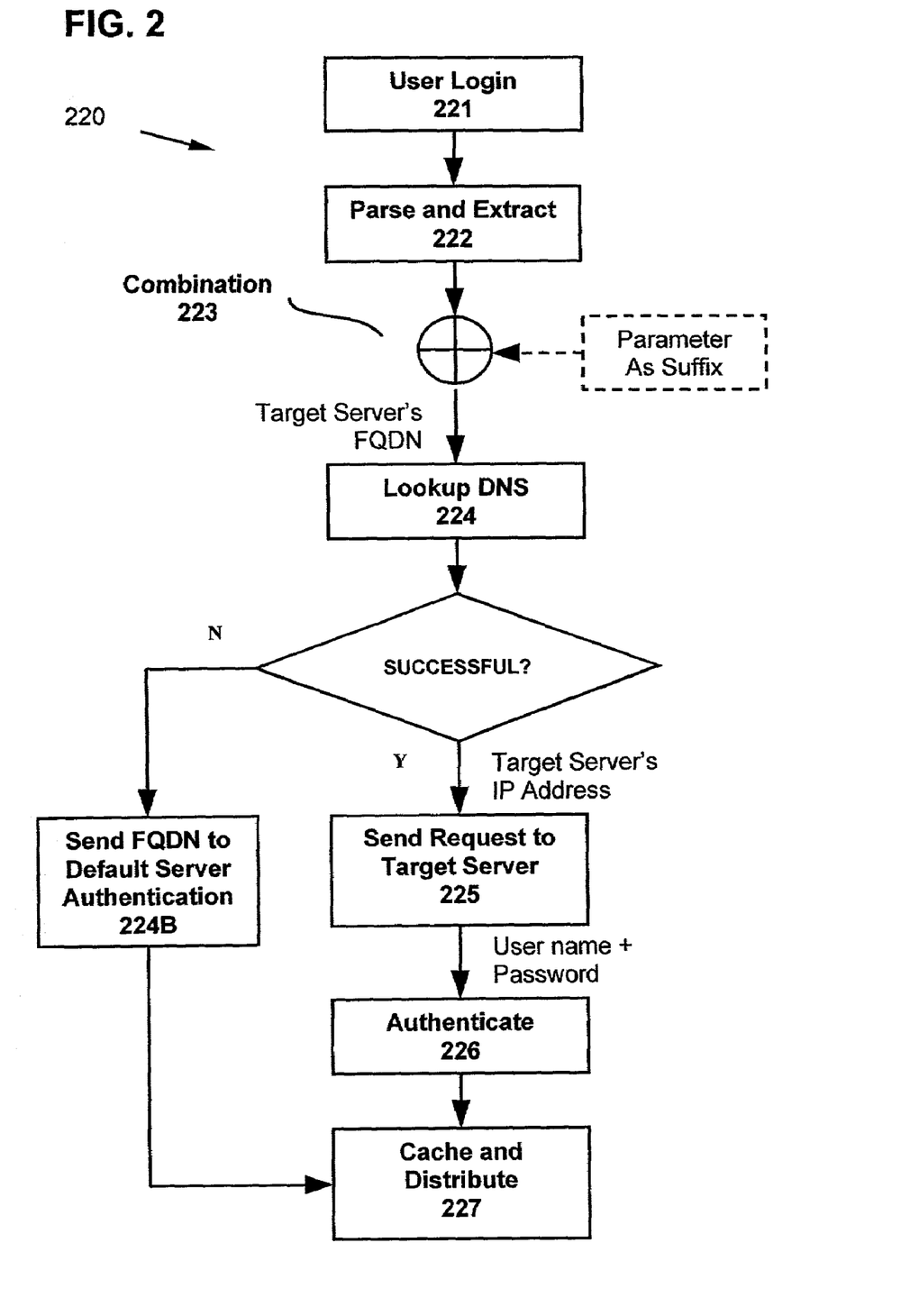
FIG. 2 is a flow diagram illustrating a process 220 for providing distributed authentication service according to one preferred embodiment of the invention.

FIG. 2 is a flow diagram illustrating a process 220 for providing distributed authentication service according to one embodiment of the invention. The distributed authentication service is provided via a network with a unique domain name. The network includes a number of participating authentication servers and a number of clients. The network's domain name is used as a common suffix for all participating servers' FQDN. For example, for all participants of the MCN network 100, the common suffix of their FQDN is MCN.ORG and AOL Authentication Server's FGDN is AOL.COM.MCN.ORG. The process includes the steps of:

Step 221. The user logs in by entering his global user identification (GUID) and his password. The GUID includes his user name followed by a delimitation symbol and a domain portion which is the domain name of the server with which the user registered. For example, an AOL registered user joe has a GUID joe @aol.com.

Step 222. Parse the GUID and extract the domain portion. For example, extract aol.com from GUID joe@aol.com.

Step 223. Append the domain name of the network as a suffix to the extracted domain portion from the GUID to form a fully qualified domain name (FQDN).

Step 224. Consult DNS for the FQDN's IP address. For example, the DNS 200 locates AOL.COM.MCN.ORG from the MCN database DB 16 and returns its IP address.

Step 225. Send user name and password to the target authentication server. For example, sends joe and secret911 to AOL Authentication Server 111.

Step 226. Carry out the authentication at the target authentication server.

Step 227. Cache and distribute the authentication result which is recognized by all authentication servers registered in the network.

As an option, the process 220 may further include:

Step 224B. If the DNS look up fails, automatically send the user name and password to a default server for authentication.

Figure 3:
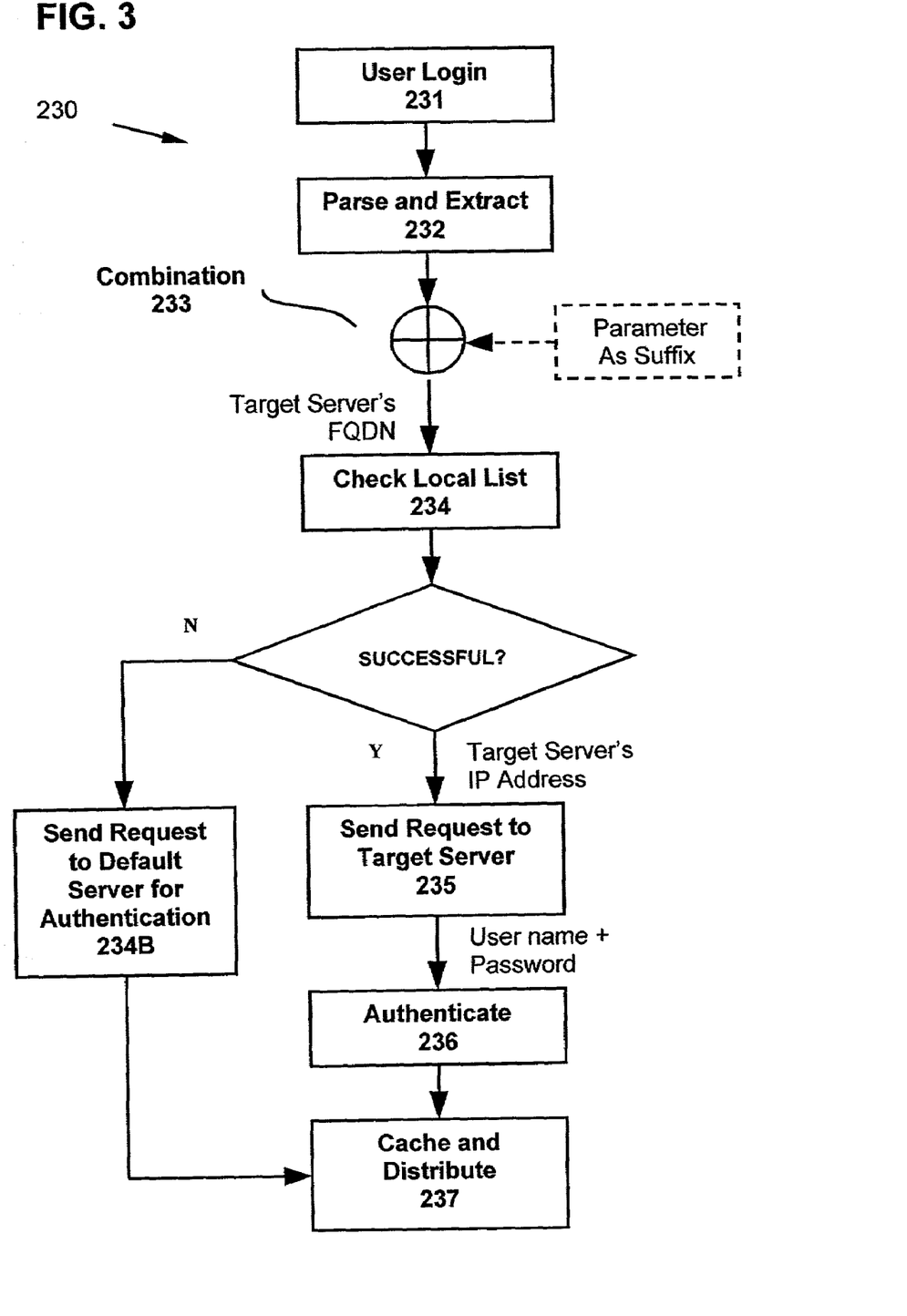
FIG. 3 is a flow diagram illustrating a process 230 for providing distributed authentication service according to another preferred embodiment of the invention.

FIG. 3 is a flow diagram illustrating a process 230 for providing distributed authentication service according to another preferred embodiment of the invention. The distributed authentication service is provided via a network with a unique domain name. The network includes a number of participating authentication servers and a number of clients. The network's domain name is used as a common suffix for all participating servers' FQDN. For example, for all participants of the MCN network 100, the common suffix of their FQDN is MCN.ORG and AOL Authentication Server's FGDN is AOL.COM.MCN.ORG. The process 230 includes the steps of:

Step 231. The user logs in by entering his global user identification (GUID) and his password. The GUID includes his user name followed by a delimitation symbol and a domain portion which is the domain name of the server with which the user registered. For example, an AOL registered user joe has a GUID joe@aol.com.

Step 232. Parse the GUID and extract the domain portion from the GUID. For example, extract aol.com from GUID joe@aol.com.

Step 233. Append the network's domain name as a suffix to the extracted domain portion from the GUID to form a fully qualified domain name (FQDN).

Step 234. Consult a predefined local mapping list of the FQDN's for all registered authentication servers to obtain an IP addresses for the FQDN formed in Step 233. In the mapping list, each FQDN is mapped to a unique IP address. This approach suits for scenario where the distributed authentication federation has a static and small list of participants.

Step 235. Send user name and password to the target authentication server. For example, sends joe and secret911 to AOL Authentication Server 111.

Step 236. Carry out the authentication at the target authentication server.

Step 237. Cache and distribute the authentication result.

As an option, the process 230 may further include:

Step 234A. If the IP address cannot be found from the local mapping list, automatically send the user name and passport to a default server for authentication.

Figure 4:
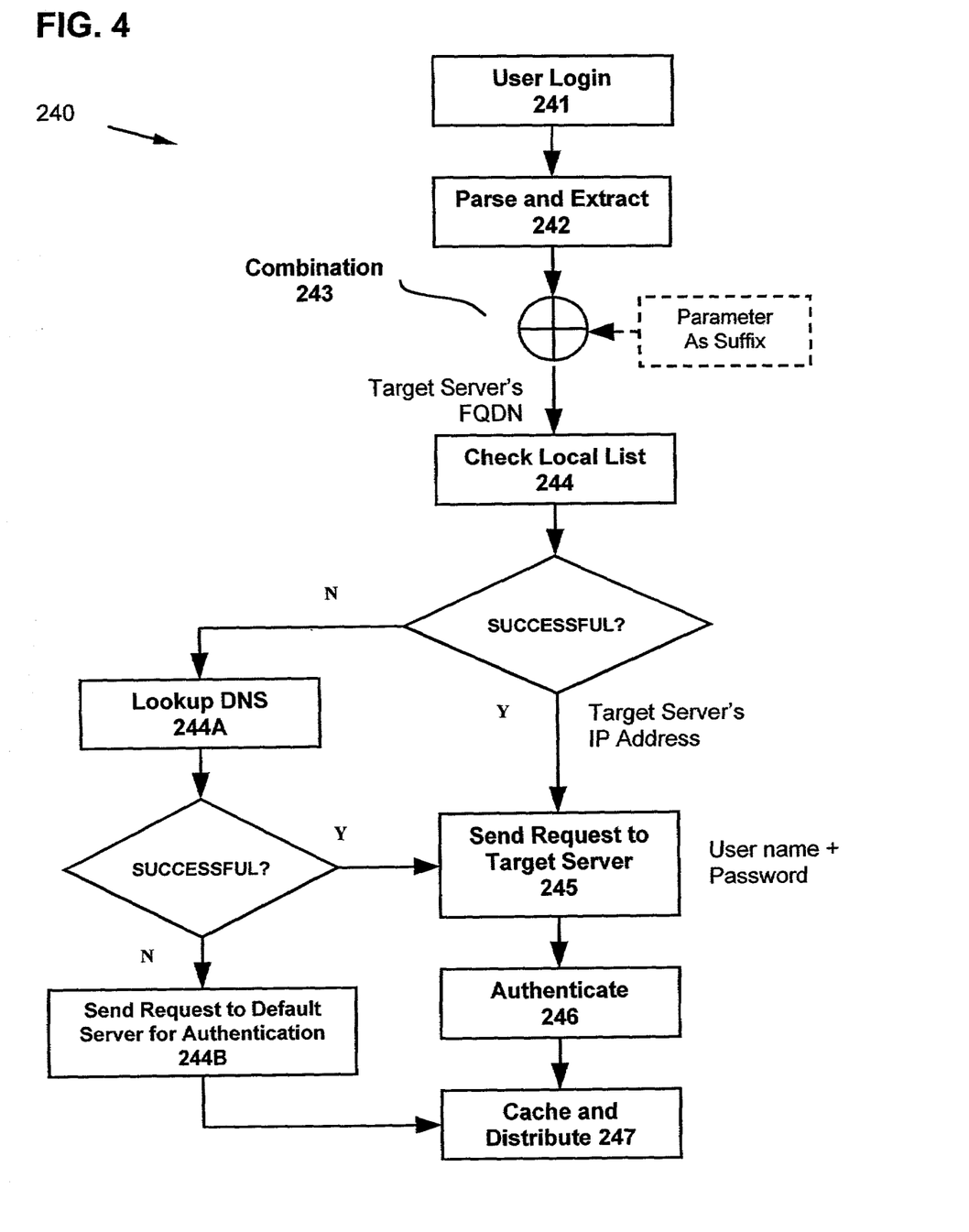
FIG. 4 is a flow diagram illustrating a process 240 for providing distributed authentication service according to another preferred embodiment of the invention.

FIG. 4 is a flow diagram illustrating a process 240 for providing distributed authentication service according to another preferred embodiment of the invention. The distributed authentication service is provided via a network with a unique domain name. The network includes a number of participating authentication servers and a number of clients. The network's domain name is used as a common suffix for all participating servers' FQDN. For example, for all participants of the MCN network 100, the common suffix of their FQDN is MCN.ORG and AOL Authentication Server's FGDN is AOL.COM.MCN.ORG. The process 240 includes the steps of:

Step 241. The user logs in by entering his global user identification (GUID) and his password. The GUID includes his user name followed by a delimitation symbol and a domain portion which is the domain name of the server with which the user has registered. For example, an AOL registered user joe has a GUID joe@aol.com.

Step 242. Parses the GUID and extracts the domain portion. For example, extract aol.com from GUID joe@aol.com.

Step 243. Append the network's domain name as a suffix to the extracted domain portion from the GUID to form a fully qualified domain name (FQDN).

Step 244. Consult a predefined local mapping list of the FQDN's for registered authentication servers to obtain an IP addresses for the FQDN formed in Step 243. In the mapping list, each FQDN is mapped to a unique IP address.

Step 244A. If Step 244 fails, consult DNS for the FQDN's IP address. For example, the DNS system locates AOL-.COM.MCN.ORG from the MCN database DB 16 and returns its IP address. This approach balances performance efficiency and adaptation of dynamic changes of the participant list.

Step 244B. If Step 244A fails, automatically send the user name and password to a default server for specific authentication.

Step 245. Send user name and password to the target authentication server. For example, sends joe and secret911 to AOL Authentication Server 111.

Step 246. Carry out the authentication at the target authentication server.

Step 247. Cache and distribute the authentication result.

Figure 5:
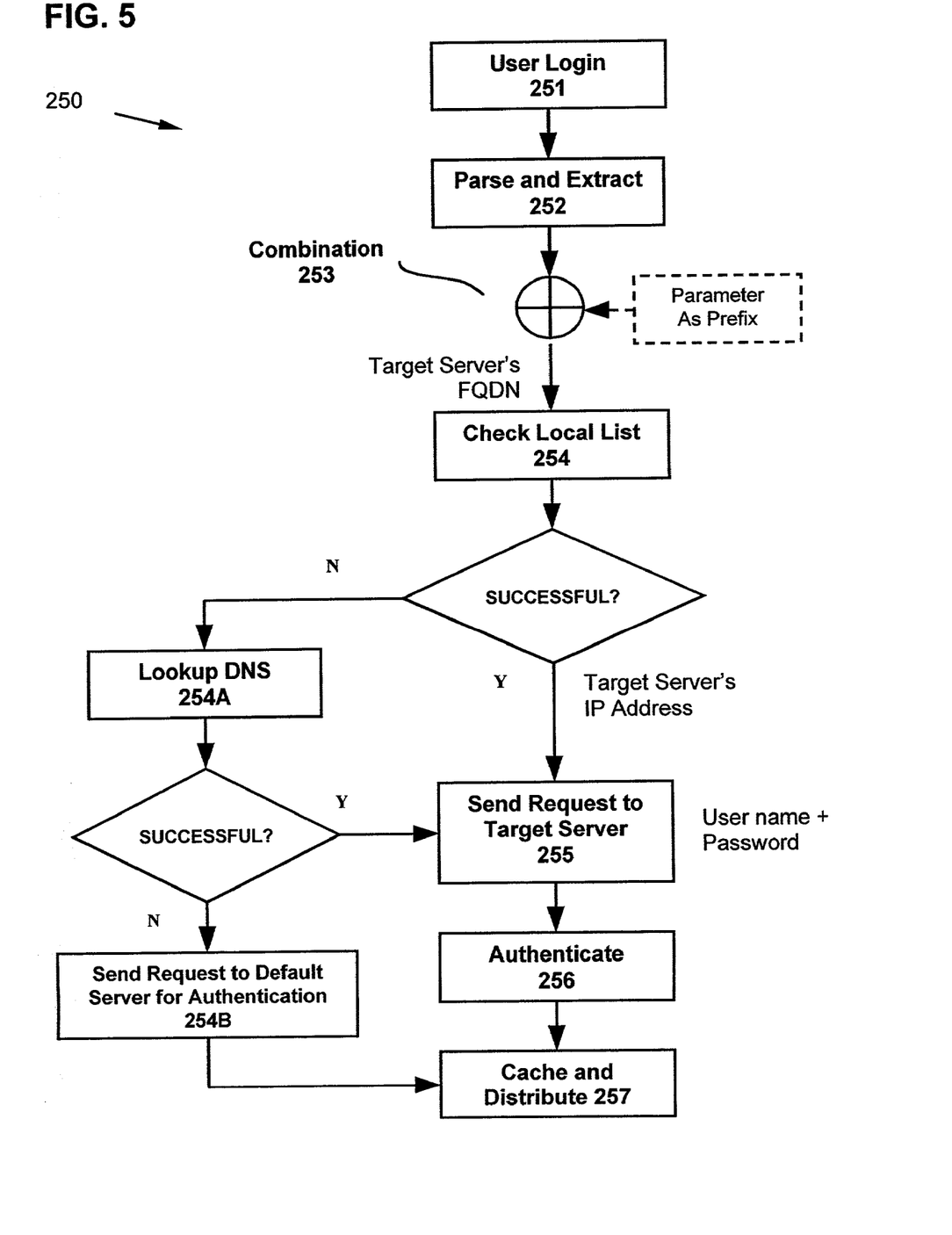
FIG. 5 is a flow diagram illustrating a process 250 for providing distributed authentication service according to another preferred embodiment of the invention.

FIG. 5 is a flow diagram illustrating a process 250 for providing distributed authentication service according to another preferred embodiment of the invention. The process 250 includes the steps of:

Step 251. The user logs in by entering his global user identification (GUID) and his password. The GUID includes his user name followed by a delimitation symbol and a domain portion which is the domain name of the server with which the user has registered. For example, an AOL registered user joe has a GUID joe @aol.com.

Step 252. Parses the GUID and extracts the domain portion. For example, extract aol.com from GUID joe@aol.com.

Step 253. Prepend a predefined parameter (e.g., "AUTHENTICATION" or "AUTH") representing a standard authentication server name as a prefix to the extracted domain portion from the GUID to form a fully qualified domain name (FQDN) in its main server's domain. This FQDN is same as the registered domain name of a target authentication server. For example, AOL Authentication Server's FQDN is AUT.AOL.COM.

Step 254. Consult a predefined local mapping list of the FQDN's of all registered authentication servers to obtain an IP addresses for the FQDN formed in Step 253. In the mapping list, each FQDN is mapped to a unique IP address.

Step 254A. If Step 254 fails, consult DNS for the FQDN's IP address. For example, the DNS system locates AUTH.A-OL.COM from a certain MCN database and returns its IP address. This approach balances performance efficiency and adaptation of dynamic changes of the participant list.

Step 254B. If Step 254A fails, automatically send the user name and password to a default server for specific authentication.

Step 255. Send user name and password to the target authentication server. For example, sends joe and secret911 to AOL Authentication Server 111.

Step 256. Carry out the authentication at the target authentication server.

Step 257. Cache and distribute the authentication result to the client.

Definition: In this document, "fully qualified domain name (FQDN)" means a full site-name, which consists of (1) a local host name, and (2) a domain name. The suffix of the domain name is a top-level domain (tld). For example, AUTH.AOL.COM is a FQDN, in which AUTH is its local host name; AOL.COM is its domain name; and .COM is a top-level domain. For another example, AOL.COM.MC-N.ORG is a FQDN, in which AOL.COM is its local host name; MCN.ORG is its domain name; and ORG is a top-level domain.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

The invention claimed is:

1. In a distributed network which is registered with a unique domain name, said network comprising a number of clients and a number of authentication servers, said clients and said authentication servers being communicatively coupled to each other via a global telecommunication network, each of said authentication servers having a fully qualified domain name which is a local host name with said unique domain name appended, a distributed authentication system, wherein a given user enters a global user identification (GUID) and a password for authentication to be carried out at a target authentication server, said GUID comprising a user name, a delimitation symbol, and a domain portion which is same as the local host name of said target authentication server, said distributed authentication system comprising:
  a client for parsing an entered GUID and extracting said domain portion therefrom;
  means for appending said unique domain to said domain portion to form a fully qualified domain name (formed FQDN);
means for translating said FQDN to an Internet Protocol (IP) address representing said target authentication server;
  means for sending said user name and password to said target authentication server for authentication;
  means for carrying out said authentication at the target authentication server and generating an authentication token that is recognizable by all authentication servers registered in said distributed network;
  responsive to said generating said authentication token, means for caching said authentication token on a participant authentication server; and
  means for distributing said authentication token to any participant authentication server registered in said distributed network.

2. The distributed authentication system of claim 1, further comprising:
  means for automatically mapping any unrecognized FQDN into a default server which carries out authentication on the user's authentication request.

3. The distributed authentication system of claim 1, wherein said means for translating consults a domain name system (DNS) to obtain an Internet Protocol (IP) address representing said target authentication server.

4. The distributed authentication system of claim 1, wherein said means for translating consults a local mapping list to obtain an Internet Protocol (IP) address representing said target authentication server.

5. A method for providing distributed authentication service, wherein a given user enters a global user identification (GUID) and a password for authentication to be carried out at a target authentication server, said GUID comprising a user name, a delimitation symbol, and a domain portion which is same as the local host name of said target authentication server, said method comprising the computer-implemented steps of:
  entering the user's GUID and password;
  parsing said entered GUID and extracting said domain portion from said GUID by a client;
  appending a unique domain name to said domain portion to form a fully qualified domain name (FQDN);
  looking up said FQDN in a domain name system (DNS) to obtain an address representing said target authentication server;
  sending said user name and password to said target authentication server for authentication;
  carrying out said authentication at the target authentication server and generating an authentication token that is recognizable by all authentication servers registered in a associated distributed network; and
  responsive to said generating said authentication result, caching said authentication result on a participant authentication server; and
  distributing said authentication token to any authentication server registered in said distributed network.

6. The method of claim 5, further comprising the steps of:
  if said step of looking up fails, automatically mapping an unrecognized FQDN into a default server which performs authentication on the user's authentication request.

7. In a distributed network which is registered with a unique domain name, said network comprising a number of clients and a number of authentication servers, said clients and said authentication servers being communicatively coupled to each other via a global telecommunications network, each of said authentication servers having a fully qualified domain name which is a local host name with said unique domain name appended, a method for providing distributed authentication service, wherein a given user enters a global user identification (GUID) and a password for authentication to be carried out at a target authentication sever, said GUID comprising a user name, a delimitation symbol and a domain portion which is same as the local host name of said target authentication server, said method comprising the steps of:
  entering the user's GUID and password;
  parsing entered GUID and extracting said domain portion from said GUID by a client;
  appending said unique domain name to said domain portion to form a fully qualified domain name (FQDN);
  checking a local list of registered fully qualified domain names (FQDN) to obtain an Internet Protocol (IP) address for said target authentication server, wherein each FQDN in said local list is mapped to a unique P address;
  sending said user name and password to said target authentication server for authentication;
  carrying out said authentication at the target authentication server and generating an authentication token that is recognizable by all authentication servers registered in said distributed network; and
  responsive to said generating said authentication result, caching said authentication token on a participant authentication server; and
  distributing said authentication toke to any participant authentication server registered in said distributed network.

8. The method of claim 7, further comprising the step of:
  if said step of checking fails, automatically mapping an unrecognized FQDN into a default server which performs authentication on the user's authentication request.

9. In a distributed network which is registered with a unique domain name, said network comprising a number of clients and a number of authentication servers, said clients and said authentication servers being communicatively coupled to each other via a global telecommunications network, each of said authentication servers having a fully qualified domain name which is a local host name with said unique domain name appended, a method for providing distributed authentication service, wherein a given user enters a global user identification (GUID) and a password for authentication to be carried out at a target authentication server, said GUID comprising a user name, a delimitation symbol and a domain portion which is same as the local host name of said target authentication server, said method comprising the computer-implemented steps of:

entering the user's GUID and password;

parsing said GUID and extracting said domain portion by a client;

appending said unique domain name to said domain portion to form a fully qualified domain name (FQDN) in said unique domain;

checking a local list of registered fully qualified domain names (RFQDN) to obtain an Internet Protocol (IP) address for said target authentication server, wherein each RFQDN in said local list is mapped to a unique IP address;

if said step of checking fails, looking up a domain name system (DNS) to obtain an Internet Protocol (IP) address representing said FQDN;

sending said user name and password to said target authentication server for authentication;

carrying out said authentication at the target authentication server and generating an authentication token that is recognizable by all authentication servers registered in said distributed network; and  responsive to said generating said authentication result, caching said authentication token on a participant authentication server; and  distributing said authentication result to any participant authentication server registered in said distributed network.

10. The method of claim 9, further comprising the step of:

if said step of looking up fails, automatically mapping an unrecognized FQDN into a default server which performs authentication on the user's authentication request.

11. A method for providing distributed authentication service, wherein a given user enters a global user identification (GUID) and a password for authentication to be carried out at a target authentication server, said GUID comprising a user name, a delimitation symbol and said target authentication server's domain name, said method comprising the steps of:

entering the user's GUID and password;

parsing said entered GUID and extracting said target authentication server's domain name by said client;

pre-pending said common local host name to said target authentication server's domain name to form a fully qualified domain name (FQDN);

checking a local list of registered fully qualified domain names (RFQDN) to obtain an address for said target authentication server, wherein each RFQDN in said local is mapped to a unique address;

sending said user name and password to said target authentication server for authentication;

carrying out said authentication at the target authentication server and generating an authentication result that is recognizable by all authentication servers registered in a associated distributed network; and  responsive to said generating said authentication result, caching said authentication token on a participant authentication server; and  distributing said authentication result to any authentication server registered in said distributed network.

12. The method of claim 11, further comprising the step of:

if said step of checking fails, looking up said FQDN in a domain name system (DNS) to obtain an address representing said target authentication server.

13. The method of claim 12, further comprising the steps of:

if said step of looking up fails, automatically mapping an unrecognized FQDN into a default server which performs authentication on the users authentication request.

14. In a distributed network comprising a number of clients and a number of authentication servers, said clients and said authentication servers being communicatively coupled to each other via a global telecommunications network, each of said authentication servers having a fully qualified domain name which is a local host name with its domain name appended, a method for providing distributed authentication service, wherein a given user enters a global user identification (GUID) and a password for authentication to be carried out at a target authentication server, said GUID comprising a user name, a delimitation symbol and said target authentication server's domain name, said method comprising the steps of:

entering the user's GUID and password;

parsing said entered GUID and extracting said target authentication server's domain name by a client;

checking a local list of domain names to obtain an Internet Protocol (IP) address for said target authentication server, wherein each domain name in said list is mapped to a registered authentication servers IP address;

sending said user name and password to said target authentication server for authentication;

carrying out said authentication at the target authentication server and generating an authentication result that is recognizable by all authentication servers registered in said associated distributed network; and  responsive to said generating said authentication result, caching said authentication token on a participant authentication server; and  distributing said authentication result to any participant authentication server registered in said distributed network.

15. The method of claim 14, further comprising the step of:

if said step of checking fails, automatically mapping an unrecognized domain name into a default server which performs authentication on the user's authentication request.

\* \* \* \* \*